June 26, 1956 R. A. SANDBERG 2,751,796
HAND BRAKE LEVER HANDLE CONSTRUCTION
Filed Sept. 18, 1951 2 Sheets-Sheet 1
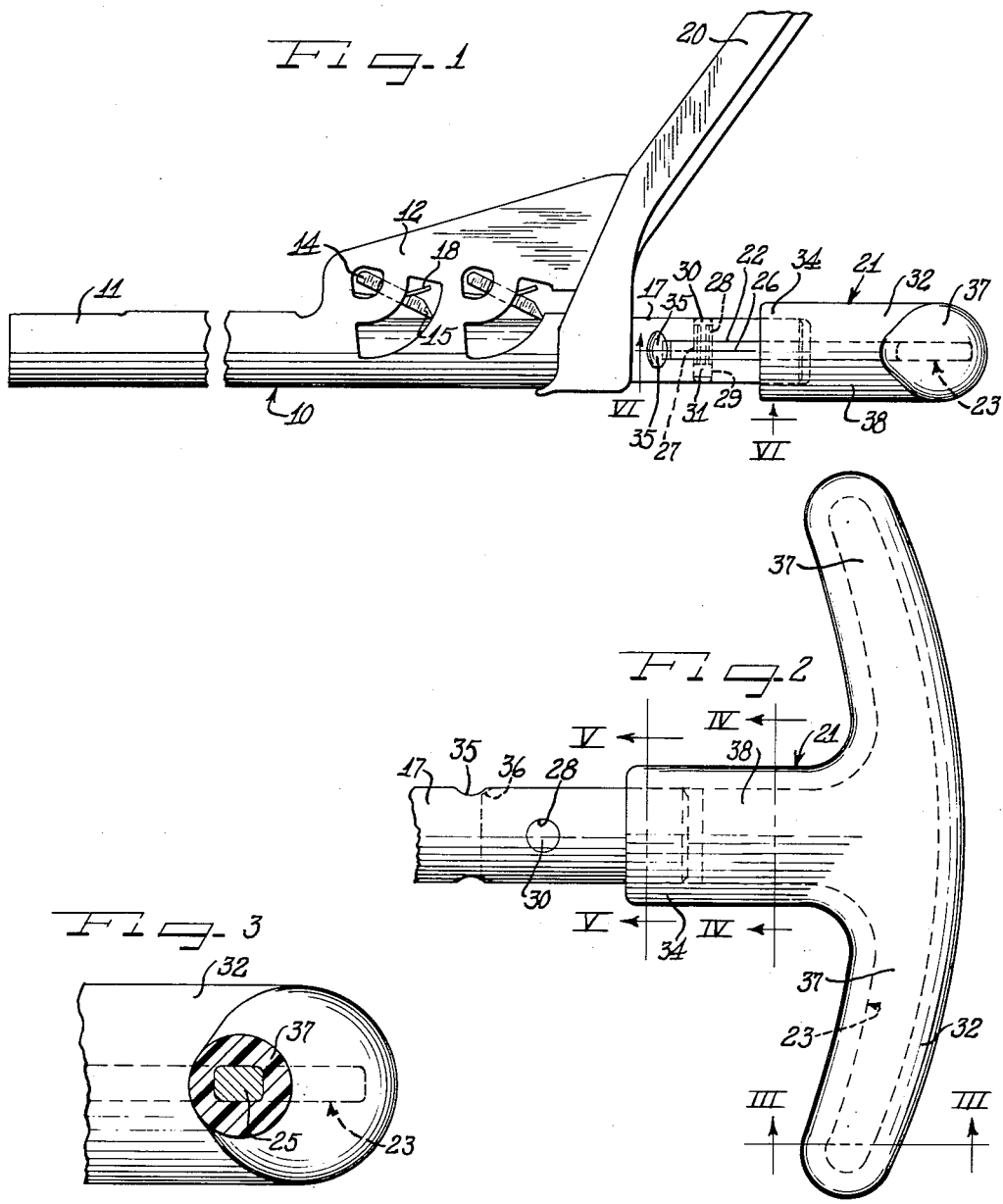
Inventor
Ray A. Sandberg

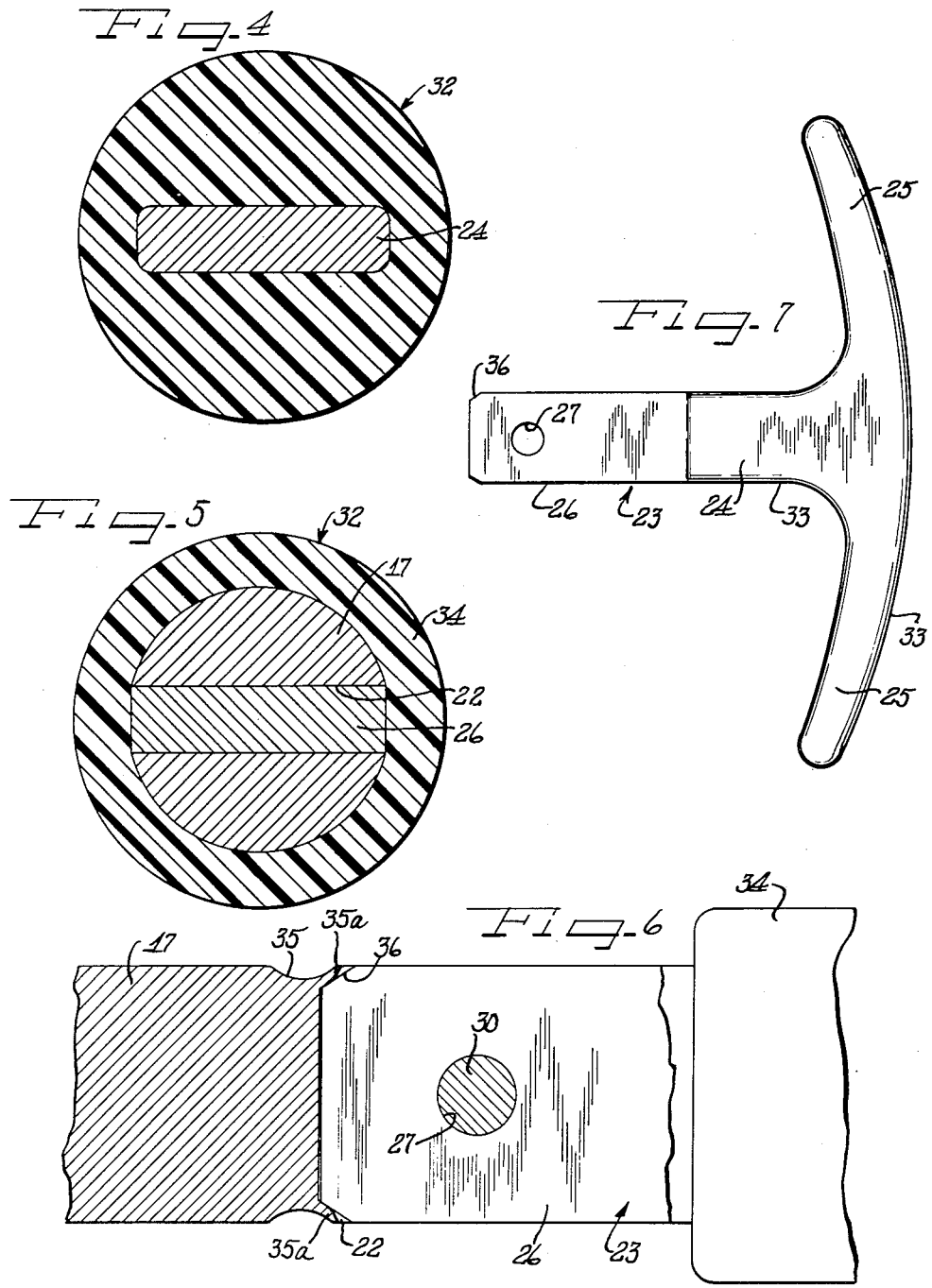

United States Patent Office 2,751,796
Patented June 26, 1956

2,751,796

HAND BRAKE LEVER HANDLE CONSTRUCTION

Ray A. Sandberg, Waukegan, Ill., assignor to Houdaille Industries, Inc., a corporation of Michigan Application September 18, 1951, Serial No. 247,132

8 Claims. (Cl. 74—543)

This invention concerns improvements in hand brake lever constructions, and more particularly relates to a novel pull rod and handle assembly therefor.

In a straight pull-type of brake lever assembly a reciprocal and rotary pull rod carries a handle utilized both in pulling the rod rearwardly to actuate the brake and in turning the pull rod for releasing the brake. For this purpose a sturdy handle is required which will be capable of withstanding considerable pulling and torsional forces. The handle must also be of attractive appearance because it is located in service at the interior of a vehicle. Further, it must be economical to produce for competitive reasons.

An important object of the present invention is to provide a novel brake rod and composite handle assembly of sturdy and serviceable, but economical construction and of satisfactory appearance.

Another object of the invention is to provide novel means for attaching a rod and handle.

A further object of the invention is to provide a novel molded handle.

Still another object of the present invention is to provide a novel molded plastic handle and means for attaching the handle to a metal rod.

A still further object of the present invention is to provide a novel handle insert structure for use in a plastic and especially a non-metallic plastic handle adapted for hand brake levers or the like.

Other objects, features and advantages of the present invention will be apparent from the following detailed description of a preferred embodiment, for purposes of example only, as shown in the accompanying drawings in which:

Figure 1 is a fragmental side elevational view of a straight pull brake lever structure for actuating the parking brakes of a vehicle or the like as it might be employed with a handle construction according to the present invention;

Figure 2 is a partial top plan view of the hand brake lever handle construction;

Figure 3 is a fragmentary cross-sectional view of the handle assembly taken substantially along the line III—III of Figure 2;

Figure 4 is an enlarged cross-sectional view through the handle assembly taken substantially along the line IV—IV of Figure 2;

Figure 5 is an enlarged cross-sectional view through the handle construction taken substantially along the line V—V of Figure 2;

Figure 6 is a fragmentary enlarged longitudinal sectional view taken substantially on the line VI—VI in Figure 1; and Figure 7 is a plan view of a novel handle insert according to the present invention.

In Figure 1 is illustrated a straight pull brake lever structure 10 for actuating the emergency brake of a vehicle such as an automobile, or a truck. The brake lever structure 10 includes a support and guide tube 11 having at the rear end portion a pair of upstanding spaced parallel legs, or flanges 12 which operatively support a pair of pawl means such as pawls 14 in tandem relationship. The pawls have wedge-like free end portions 15 which are adapted to engage successively a plurality of ratchet teeth (not shown) formed in series relation longitudinally along a peripheral portion of a brake actuating pull rod 17. The pull rod 17 is slidably disposed in the supporting and guiding tube 11 and is pulled rearwardly to actuate the brakes. The pawls 14 are resiliently urged downwardly to engage the ratchet teeth by means of wire biasing springs 18.

For attaching the supporting and guiding tube 11 to a portion of the vehicle such as the instrument panel thereof (not shown) an escutcheon, or attachment bracket 20 is fixedly attached to the rear end portion of the tube 11.

Attached to the rear end of the pull rod 17 is a handle assembly 21 which is adapted to be pulled rearwardly in the orientation shown in Figure 1 to set the brakes. To release the brakes, the handle assembly is turned clockwise to remove the ratchet teeth from engagement by the pawls 14 whereupon the pull rod slides forwardly to release the brakes.

According to the principles of the present invention, the pull rod 17 has a longitudinal, rearwardly opening rectangular slot 22 bifurcating the rear end of the rod for receiving therein the handle assembly 21.

The handle assembly 21 includes a generally T-shaped handle insert or skeleton 23 preferably of flat plate metallic stamping construction including a stem 24 and integral oppositely extending arms or ears 25. The stem 24 includes a rectangular end portion 26 for close fitting insertion into the pull rod slot 22. The stem 24 also has an opening 27 extending transversely and spaced inwardly from the marginal edge of the stem end to register with corresponding transverse openings 28, 29 in the pull rod bifurcated end, Figure 1. The handle assembly is retained within the slot 22 by means of a knurled pin 30 having a plain end of reduced diameter 31 which may be utilized for wedging engagement in the aligned openings 27, 28, 29.

As best seen in Figures 2, 3, 4 and 5, a plastic handle body 32, which is preferably of a non-metallic plastic, is solidly molded on the handle insert 23. To prevent sharp edges on the handle insert from cutting into the plastic handle body due to various strains and forces exerted thereon in service, the embedded edges of the handle insert are smoothed off as by being rounded as indicated at 33. As best seen in Figure 5, the handle body 32 has a tubular hub portion 34 encompassing a portion of the stem end 26 of the handle insert 23. The handle body tubular portion 34 thus provides a recessed socket for closely receiving the slotted end of the pull rod 17 when the handle assembly and pull rod are attached. The handle body hub portion 34, therefore, acts to prevent rocking movement of the handle insert on the pin 30.

To assure that the handle will not be broken at its socket due to accidental knocking thereof or the like, the pull rod 17 is deformed as indicated at 35 adjacent the end of the slot to flow or upset metal in the form of interlock bosses or shoulders 35a (Fig. 6) against a reduced end providing chamfered shoulders 36 at the corners of the stem end portion 26. In case of any tendency of the rod to twist or rock about the axis of the pin 30, the interlock shoulders 35a of the rod will absorb the force and prevent undue pressure from being exerted upon the handle body socket portion 34.

To turn the pull rod 17 to release the brakes, the handle body 32 is grasped, the fingers of the hand generally encircling handle body ear portions 37. As shown in Figure 3, the ear portions 37 are solidly formed around the handle insert ears 25 so that the turning force on the ear portions 37 is transmitted to the handle insert ears 25 and through the insert to the pull rod slot walls. Thus, relatively little force is transmitted by the handle body ear portions 37 to stem portion 38 of the handle body.

The handle body therefore is not subjected to forces which might tend to break the ear portions 37 or other parts thereof during turning of the handle.

Because of the double interconnection between the handle assembly and the pull rod, rocking of the handle assembly on the rod is effectively prevented and a substantially rattleproof and sturdy connection is achieved. Another advantage of the present invention resides in the fact that the handle assembly and pull rod need not be assembled until after the molding of the handle body 32 on the handle insert 23. The molding operation and the transportation of the various parts of the construction to the point of assembly are thus considerably simplified.

It will be understood that modifications and variations may be effected without departing from the scope of the novel concepts of the present invention.

I claim as my invention:

1. In combination in a hand brake lever construction, a brake actuating rod having an end with a longitudinal bifurcating rectangular slot therein, the slotted end having transverse aligned openings therein longitudinally spaced from the end of the slot and extending into the slot, a handle insert of generally flat plate construction including a stem and integral oppositely extending ears, the stem having a rectangular end for insertion in said slot and a transverse opening therein for alignment with said aligned slot openings when said stem end is seated in the slot, a pin for insertion in said aligned openings to retain the handle insert in engagement with said rod, said handle insert stem end having a reduced end portion, said rod being deformed against said reduced end portion to prevent rocking of said insert on said pin, and a handle formed on said insert including a tubular hub portion affording a socket for receiving the slotted end of said rod upon fitting of the insert in said slot to further prevent rocking of said insert on said pin.

2. In combination in a hand brake lever construction, a brake actuating rod having an end with a longitudinal bifurcating rectangular slot therein, the slotted end having transverse aligned openings therein longitudinally spaced from the end of the slot extending into the slot, a handle insert of generally flat plate construction including a stem and integral oppositely extending ears, the stem having an end portion for insertion in said slot and a transverse opening therein for alignment with said aligned openings when said stem end portion is seated in the slot, a pin for insertion in said aligned openings to retain the handle insert in engagement with said rod, said handle insert stem end portion having a reduced end providing respective shoulders at opposite sides of the slot and offset from the axis of the rod, and shoulder means on said rod cooperating with said respective shoulders to prevent rocking of said insert on said pin.

3. In combination in a hand brake lever assembly, a brake actuating rod having a slot in an end thereof, a handle insert having an end portion for close fitting engagement in said slot, pin means for retaining the insert in said slot, shoulders on said rod opposing said end portion of the insert to prevent rocking of said insert on said pin means, and a handle body carried by said insert including a tubular hub portion affording a socket for receiving the slotted end of said rod and further preventing rocking of said insert on said pin means.

4. A handle assembly comprising an insert of integral flat plate construction and of generally T-shape having a thickness substantially less than the width thereof and including a flat rectangular end, and a handle formed on and permanently secured with said handle insert and closely adhering thereto, said handle having a tubular hub portion encompassing a portion of said flat rectangular insert end and defining with said insert end portion a pair of segmental cylindrical recesses extending longitudinally of said hub portion for receiving a bifurcated end of a connecting member in sliding relation to said insert end portion and within said tubular hub portion.

5. A handle assembly comprising an insert of integral flat plate construction and of generally T-shape of width substantially greater than the thickness thereof including a flat rectangular end having a reduced marginal end portion and a transverse opening spaced longitudinally from the reduced end portion, and a handle formed on said handle insert and closely adhering thereto, said handle having a tubular hub portion encompassing a portion of said insert, but terminating in spaced relation from said reduced end portion and said transverse opening.

6. In combination in a handle construction of the character described, a flat metallic stamping of substantially T-shape including a stem having a flat rectangular end of width substantially greater than the thickness thereof, a molded handle body of non-metallic plastic material substantially encompassing said stamping so that the stamping provides a rigidifying skeleton for the plastic body, a brake actuating rod having an end with a longitudinal bifurcating rectangular slot therein of width substantially greater than its height, the slotted end having transverse aligned openings therein longitudinally spaced from the end of the slot and extending into the slot, said rod slotted end telescoping over said flat rectangular end of said insert stem, said handle having a tubular hub portion encompassing a portion of the slotted end portion of said actuating rod but terminating in longitudinally spaced relation to the aligned openings in said rod, said stem rectangular end having a transverse opening therein aligned with said aligned openings in said actuating rod, and a pin inserted in said aligned openings of said rod and said stem rectangular end to retain the handle insert in engagement with said rod, the pin serving to retain the handle with the rod in spite of longitudinal separating forces, and the walls of the actuating rod slot and the opposed walls of the stem rectangular end serving to transmit torsional forces exerted on the handle to the actuating rod.

7. In a handle and rod combination capable of joint longitudinal and torsional force applying movements imparted by manipulation of the handle to the rod, the rod having a longitudinal slot in one end portion thereof, the handle having an insert extension projecting into said slot spaced from a body portion of the handle so as to be substantially clear from said body portion, and a pin extending through and connecting the slotted end portion of the rod and said insert extension, said body portion including a socket fitting over the adjacent slotted extremity portion of the rod spaced from the pin for substantially holding the handle and rod against rocking about the axis of said pin.

8. In a handle and rod combination capable of joint longitudinal and torsional force applying movements imparted by manipulation of the handle to the rod, the rod having a longitudinal slot in one end portion thereof, the handle having an insert extension projecting into said slot spaced from a body portion of the handle so as to be substantially clear from said body portion, and a pin extending through and connecting the slotted end portion of the rod and said insert extension, said insert and the rod having interengaging shoulders spaced from said pin to retain the handle and the rod against relative rocking about the axis of the pin.

(References on following page)

References Cited in the file of this patent

UNITED STATES PATENTS

| Number | Name | Date |
|---|---|---|
| 838,249 | Hanlin | Dec. 11, 1906 |
| 967,508 | Fortas et al. | Aug. 16, 1910 |
| 1,181,565 | Block | May 2, 1916 |
| 1,212,969 | Lamb et al. | Jan. 16, 1917 |
| 1,365,985 | Gullborg | Jan. 18, 1921 |
| 1,595,082 | Gammeter | Aug. 10, 1926 |
| 1,659,592 | Devereaux | Feb. 21, 1928 |
| 1,876,693 | Kraft | Sept. 13, 1932 |
| 2,047,704 | Podolsky | July 14, 1936 |
| 2,098,515 | Pardieck | Nov. 9, 1937 |
| 2,100,147 | Oehman | Nov. 23, 1937 |
| 2,210,562 | Anderson | Aug. 6, 1940 |
| 2,252,524 | Quillery | Aug. 12, 1941 |
| 2,253,831 | Wantz | Aug. 26, 1941 |
| 2,290,807 | Keeler et al. | July 21, 1942 |
| 2,304,356 | Heller | Dec. 8, 1942 |
| 2,327,891 | Herman | Aug. 24, 1943 |
| 2,429,224 | Fergueson et al. | Oct. 21, 1947 |
| 2,433,993 | Jakeway et al. | Jan. 6, 1948 |
| 2,617,216 | Kilgour | Nov. 11, 1952 |
| 2,671,353 | Hinsey | Mar. 9, 1954 |

FOREIGN PATENTS

| Number | Country | Date |
|---|---|---|
| 9,767 | Great Britain | May 28, 1900 |